United States Patent
Synnergren et al.

(10) Patent No.: US 8,239,547 B2
(45) Date of Patent: Aug. 7, 2012

(54) METHOD AND ARRANGEMENT FOR PROVIDING DIFFERENT SERVICES IN A MULTIMEDIA COMMUNICATION SYSTEM

(75) Inventors: Per Synnergren, Lulea (SE); Mats Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 11/571,783

(22) PCT Filed: Jul. 9, 2004

(86) PCT No.: PCT/SE2004/001119
§ 371 (c)(1),
(2), (4) Date: Oct. 15, 2008

(87) PCT Pub. No.: WO2006/006897
PCT Pub. Date: Jan. 19, 2006

(65) Prior Publication Data
US 2009/0055473 A1    Feb. 26, 2009

(51) Int. Cl.
*G06F 15/16* (2006.01)
(52) U.S. Cl. ........ 709/228; 709/204; 709/206; 709/232; 370/260; 370/312
(58) Field of Classification Search .......... 709/206, 709/228, 232, 204; 370/312, 260
See application file for complete search history.

(56) References Cited

U.S. PATENT DOCUMENTS

| | | | |
|---|---|---|---|
| 2003/0014488 A1* | 1/2003 | Dalal et al. | 709/204 |
| 2003/0156578 A1* | 8/2003 | Bergenlid et al. | 370/352 |
| 2004/0047437 A1* | 3/2004 | Hamiti et al. | 375/326 |
| 2004/0057405 A1* | 3/2004 | Black | 370/335 |
| 2004/0071099 A1 | 4/2004 | Costa-Requena et al. | |
| 2004/0125757 A1 | 7/2004 | Mela et al. | |
| 2004/0125760 A1* | 7/2004 | Newberg et al. | 370/312 |
| 2004/0190453 A1* | 9/2004 | Rasanen et al. | 370/235 |
| 2007/0218924 A1* | 9/2007 | Burman et al. | 455/466 |
| 2007/0230342 A1* | 10/2007 | Skog | 370/232 |

FOREIGN PATENT DOCUMENTS
EP    1 346 557 A1    9/2003

* cited by examiner

*Primary Examiner* — Faruk Hamza
*Assistant Examiner* — Oleg Survillo

(57) ABSTRACT

In current multimedia communication systems using session initiation protocols such as SIP, a service change (e.g. adding a new media type to an existing multimedia conversation) entails significant delays and processor load in both clients and server. The current invention solves this by separating session signaling and media control signaling in different signaling channels (141,142) and by eliminating the need to re-establish SIP sessions for each service change. The application server (120) maintains a list of all media types supported by each multimedia client (110) involved in a multimedia conversation. Each multimedia client (110) requesting to send one or several media streams with different media types to one or several other multimedia client(s) negotiates with the application server (120) only. The inventive concept significantly reduces networks delays and speeds up the service change as perceived by the user. The invention is of interest for various multimedia conferencing applications.

18 Claims, 6 Drawing Sheets

METHOD AND ARRANGEMENT FOR PROVIDING DIFFERENT SERVICES IN A MULTIMEDIA COMMUNICATION SYSTEM

TECHNICAL FIELD OF THE INVENTION

The current invention relates to a method and arrangement for providing different services in a multimedia communication system.

DESCRIPTION OF RELATED ART

Currently, initiatives within the telecommunication community such as 3GPP and 3GPP2 (3rd Generation Partnership Project) are specifying a next generation of packet switched core networks for telecommunication services. In 3GPP a core network domain is called IMS (IP Multimedia Subsystem) and in 3GPP2 it is called MMD (Multi-Media Domain).

One similarity between the IMS domain and the MMD domain is that the signaling for setting up calls or sessions are performed using SIP, Session Initiation Protocol (IETF RFC 3261). Multimedia services are set-up using SIP messages that also carry SDP, Session Description Protocol (IETF RFC 2327). A multimedia client (a terminal) that originates a session or a call must describe all media types (such as video, voice etc.) that the service will use in the SDP part of the message. The media types are then negotiated in a SIP message exchange with a called multimedia client via an application server in the core network domain.

The media is sent over IP, typically using RTP, Real Time Transport Protocol (IETF RFC 3550), but other transport and application protocols may be used.

Using IP based networks makes it possible to perform service change. Service change is the possibility to add or remove one or several media streams of same or different types to/from a multimedia service during an active session. One example is a user who wants to add or remove a video stream to an existing VoIP (Voice over IP) stream during an ongoing call.

A service change within VoIP is specified as a negotiation procedure using SIP messages. To exemplify: a client first sends a SIP message to start a VoIP call. This message is typically a SIP INVITE message. The SIP INVITE message carries the SDP, which contains a description of which speech codec to use. Later on, the user wants to add a video stream to the session by sending another SIP INVITE message, also referred to as a re-INVITE message. In the re-INVITE message the SDP is describing both the speech codec and the video codec.

A concept within the IMS/MMD framework is Push-to-Talk over cellular networks (PoC). This concept allows users of mobile telephones to communicate in half-duplex mode with a group of other users of mobile telephones in a walkie-talkie like fashion over IP. One advantage of using IP in the cellular network is that it uses network resources more efficiently. Network resources are used only for the duration of talk spurts instead for an entire call session. The call session as such is established by using SIP, and a media channel for transporting voice is using RTP. PoC requires also specific call control functions in order to realize the walkie-talkie function. For example, when a media channel is idle, a user can request access to this channel (in order to start talking to other users in the group) by pushing a button on the mobile telephone. When the user releases the button, the media channel becomes idle and other users in the group can request access to this channel. This mechanism is called 'floor control' as it relates to 'getting control of the floor'. In order to provide a globally interoperable standard for PoC, the telecommunication industry has produced a number of specifications in this field. One example is the PoC Release 1.0 specification 'PoC User Plane; Transport Protocols' which among others specifies a floor control mechanism in the media channel, using the RTP Control Protocol (RTCP). The floor control mechanism does however not address service change.

SUMMARY OF THE INVENTION

A problem with using out-of-band signaling (as for example SIP/SDP) for service change in multimedia conversations is that each signaling message passes a large number of intermediate network nodes (the SIP Core). The SIP/SDP protocol does also use large messages as the content in these messages has a 'human readable' ASCII syntax instead of being binary encoded. The SIP/SDP protocol does also require that a re-establishment of ongoing sessions is needed for each service change. All these factors will lead to unnecessary delays and high processor load.

The present invention solves these problems by firstly separating the signaling in two planes, the session signaling plane and the media control signaling plane.

The session signaling plane includes signaling for session control (e.g. using SIP signaling messages as known from prior art). The session signaling is transported on a session signaling channel. The media control signaling plane includes media control signaling as service change, floor control etc. The media control signaling is transported on a media control channel separated from the session signaling channel. The media control channel could either be implemented in an 'in-band' fashion in a media channel or using a separate channel in close relationship with the media channel.

The invention does also introduce a novel media type negotiation procedure involving an intermediate application server. This application server collects information on which media types each multimedia client involved in a session can support. From the collected information, the application server can take a decision on which media types each multimedia client is allowed to use in order to achieve maximum interoperability.

A multimedia client (a session initiating client) that desires to establish a session involving two or more multimedia clients invites the multimedia client(s) one by one. The session is established by sending an invitation message over an out-of-band signaling channel to the intermediate application server with the address to an invited multimedia client. The invitation message does also include a set of media types the session initiating client can support.

The application server forwards the session invitation message to the invited multimedia client. If the invited multimedia client accepts the invitation it responds with a set of media types it can support in a session response message. The application server responds to the session initiating client with a session response message that the session establishment succeeded.

For each invitation procedure towards other multimedia clients, the application server collects information about supported media types for these other multimedia clients.

When one of the multimedia clients involved in the session (further on referred to as the requesting or the transmitting multimedia client) wants to send a multimedia stream with one or more media types (such as voice, video etc), it sends a first media request to the application server comprising a set of 'requested' media types. The set of 'requested' media types is a subset of or equal to a set of supported media types for the requesting multimedia client. From the collected information on what media types all multimedia clients in the session can support, the application server grants the requesting multimedia client a set of 'allowed' media types in a first media grant.

The first media requests and the first media grants are sent either in the session invitation messages and the session response messages or in separate media control messages over a media control channel different from the signaling channel. This media control channel can be implemented as a separate channel or implemented 'in-band' in a media channel. The media control messages could also use a short binary syntax as opposed to the long ASCII syntax used in session control messages known from prior art (i.e. SIP).

The requesting multimedia client can now transmit a media stream (according to the set of 'allowed' media types) over the media channel to the receiving multimedia clients through the application server. The application server replicates (if necessary) the media stream and re-transmits it to the receiving multimedia clients.

At a certain time during the session, the user of the requesting multimedia client would like to make a service change towards the receiving clients, for example switching from transmitting voice only to transmit voice+video.

The requesting multimedia client sends a new media request to the application server comprising a new set of 'requested' media types. The application server grants the requesting multimedia client a new set of 'allowed' media types in a new media grant.

The requesting multimedia client can now transmit a media stream (according to the new set of 'allowed' media types) over the media channel to the receiving multimedia clients through the application server.

The new media requests and the new media grants are sent in media control messages.

The application server can very well grant the requesting multimedia client to transmit a certain media type even if all receiving multimedia clients do not support this. The application server will in this case terminate the media flow with this media type inside the application server instead of re-transmit it to the receiving multimedia clients.

The application server can also grant the requesting multimedia client different sets of 'allowed' media types depending on additional parameters, such as subscriber information, local policies enforced by the application server etc.

The main objective of the current invention is to allow for a fast and an efficient service change and the invention has several advantages. By using a media control protocol that is separated from the session control protocol and that is not passing the SIP Core, the signaling delay is reduced in the network. The inventive concept does also significantly reduce signaling by removing the need of re-establishing ongoing sessions for each service change. Reduced signaling and delays, speed up the service change procedure as perceived by the users.

The invention will now be described in more detail and with preferred embodiments and referring to accompanying drawings.

DETAILED DESCRIPTION OF EMBODIMENTS

Figure 1:
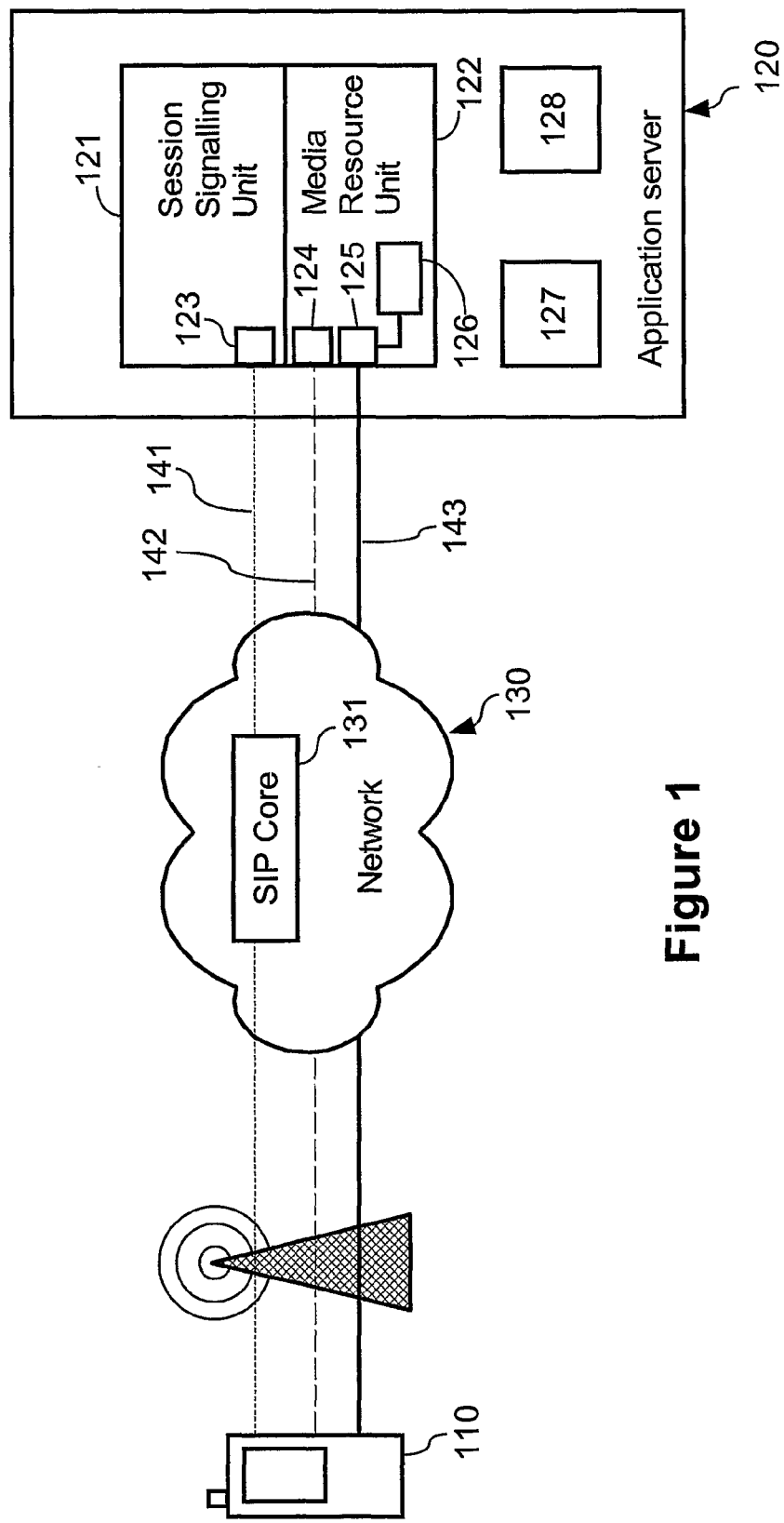
FIG. 1 is a block diagram showing a functional architecture with involved network elements and different signaling and media interfaces

A functional architecture of a multimedia communication system implementing at least one embodiment of the invention is found in FIG. 1. The architecture allows for a plurality of multimedia clients, exemplified in FIG. 1 as a mobile video telephone 110, an Application Server 120 and a network 130. The Application Server 120 comprises a number of functional entities as a Session Signaling Unit 121 and a Media Resource Unit 122. The Session Signaling Unit 121 has Signaling Interfaces 123 that receive and send SIP signaling messages from and to the Multimedia Client 110. The SIP signaling protocol is transported on a Session Signaling Channel 141. The Media Resource Unit 122 has Media Control Interfaces 124 that receive and send media control signaling from and to the Multimedia Client 110. Media control signaling is transported on a Media Control Channel 142. The media flow is transported on a Media Channel 143. The Media Resource Unit 122 has Media Interfaces 125 that receive and send the media streams from and to the Multimedia Client 110. The Media Resource Unit 122 does if necessary replicate the media stream received from Multimedia Client 110 to other multimedia clients involved in a multimedia conversation using the Replication Unit 126. The Media Resource Unit 122 can also terminate certain media types in the media stream received from Multimedia Client 110 that are not supported by certain other multimedia clients. The Application Server 120 does also comprise Processor Logic 128 for processing session signaling and media control signaling and a Memory Area 127 for storing data, including sets of supported media types for each Multimedia Client 110.

The Session Signaling Channel 141 can pass a number of different intermediate nodes in the network 130, and in each node the session signaling messages are processed. These intermediate nodes processing SIP signaling are collected under a generic term, the SIP Core 131. The Media Control Channel 142 and the Media Channel 143 are both clearly separated form the Session Signaling Channel 141. The Media Control Channel 142 and the Media Channel 143 can however optionally be integrated into the same channel.

Figure 2:
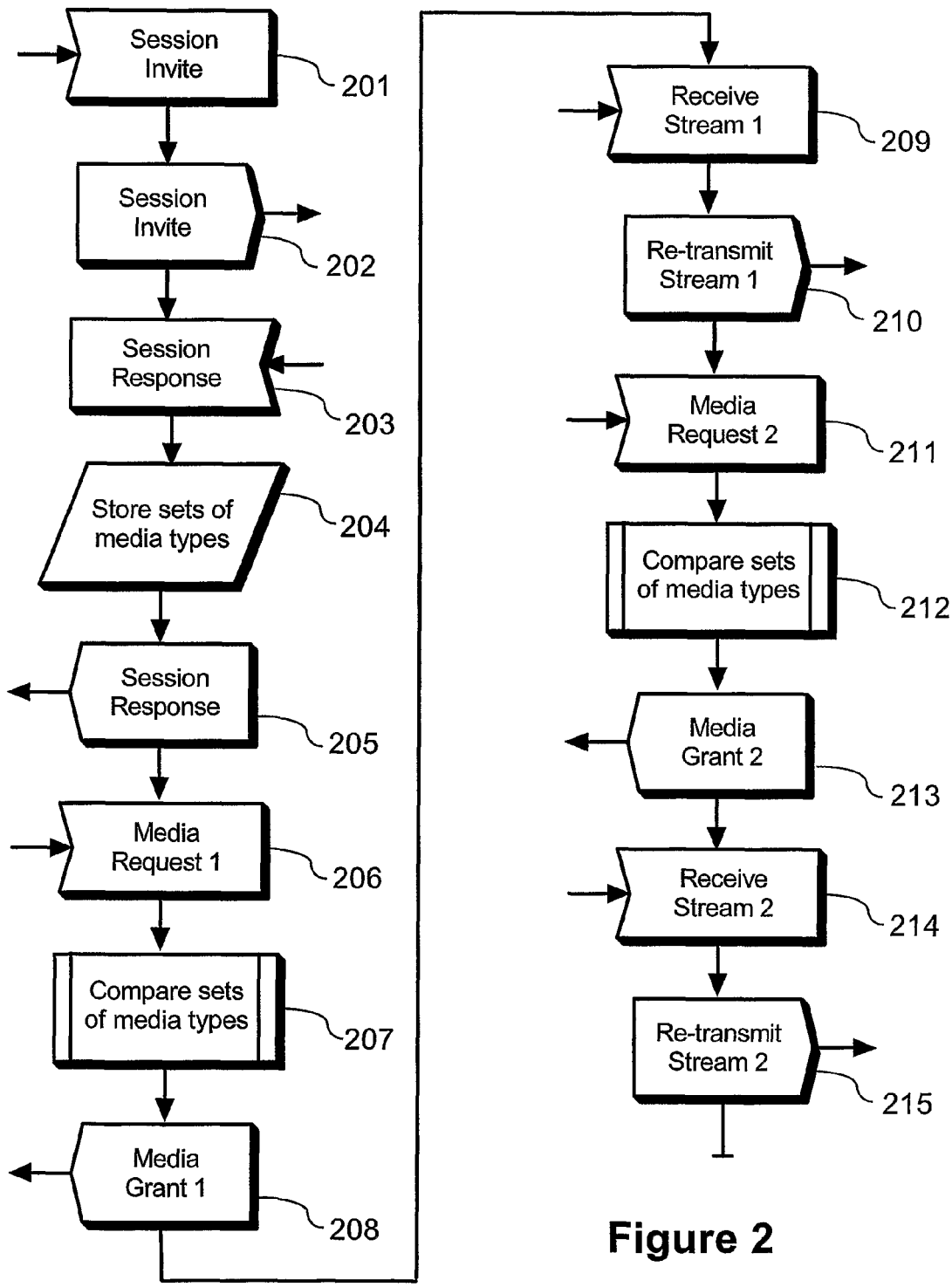
FIG. 2 is a flow chart describing a typical information flow for a service change

FIG. 2 illustrates a typical information flow for a service change as seen from the Application Server 120. The Application Server 120 receives a session invite message 201 from a first multimedia client. The session invite message comprises a set of media types supported by the first multimedia client. This set is stored 204 in the Application Server 120. The Application Server 120 sends a session invite message 202 to a second multimedia client. If the second multimedia client accepts the invitation, it sends a session response message 203. The session response message 203 comprises a set of media types supported by the second multimedia client. This set is also stored 204 in the Application Server 120. The Application Server 120 does also send a session response message 205 to the first multimedia client indicating that the session invitation was successful. The session invitation procedure can be repeated for each additional multimedia client that is invited to the session by the first multimedia client.

When any of the multimedia clients involved in the session, a requesting multimedia client, desires to start to transmit a media stream (e.g. voice) to the other multimedia clients the requesting multimedia client sends a first media request 206. This first media request 206 comprises a first set of requested media types. As the Application Server 120 has knowledge of supported media types for the other multimedia clients, the Application Server 120 compares 207 the first set of requested media types with all the sets of media types supported by the other multimedia clients and grants the request by responding with a media grant 208 with a first set of allowed media types. The requesting multimedia client can now transmit a media flow on the media channel with media types according to the first set of allowed media types. The media flow is received 209 by the Application Server 120 and is replicated (if necessary) and re-transmitted 210 to the other multimedia clients. During the conversation, the requesting multimedia client desires to modify the media flow (e.g. by adding video to an existing voice conversation). The requesting multimedia client sends a second media request 211 to the Application Server 120 comprising a second set of requested media types. The Application Server 120 compares 212 the second set of requested media types with all the sets of media types supported by the other multimedia clients, and grants the request with a second media grant 213. This second media grant 213 comprises a second set of allowed media types. The requesting media client can now transmit a modified media flow on the media channel with media types according to the second set of allowed media types. The media flow is received 214 by the Application Server 120, replicated (if necessary), and re-transmitted 215 to the other multimedia clients.

The first and second media requests 206, 211 and the first and second media grants 208, 213 are typically sent in media control messages.

The typical information flow in FIG. 2 allows for different options. If the requesting multimedia client is the same as the first multimedia client and the first multimedia client desires to start send data directly after the invitation procedure, the first media request 206 and the first media grant 208 can be incorporated in the session invitation and session response messages 202,205 respectively. Alternatively it is also possible to send the first media request 206 in the session invitation message and to send the first media grant 208 in a separate media control message.

Another option is to let the first media request 206 and the first media grant 208 be replaced by an 'implicit' media grant. If for example the Application Server 120 knows (e.g. from stored multimedia client subscription data or by looking at other parameters in the session invite message 201) that a VoIP service is requested, a first media grant 208 can be incorporated in the session invite message 202 towards the second multimedia client and in the session response message 205 towards the first multimedia client. The first media grant 208 will in this example include the media type 'voice' as a VoIP conversation normally starts with using voice.

In addition to compare media types 207, 212, the Application Server 120 can grant 208, 213 the requesting multimedia client different sets of allowed media types depending on other parameters, such as subscriber information, local policies enforced by the Application Server 120 etc.

The service change procedure described above and in FIG. 2 is of course not limited to one or two service change events only. At any time during the session at the leisure of any of the involved multimedia clients, a service change can be requested and can be repeated using the media control messages described above.

For multimedia clients not supporting a certain media type in the re-transmitted media flow, this certain media type can be terminated in the Application Server 120 before it reaches these clients.

Figure 3:
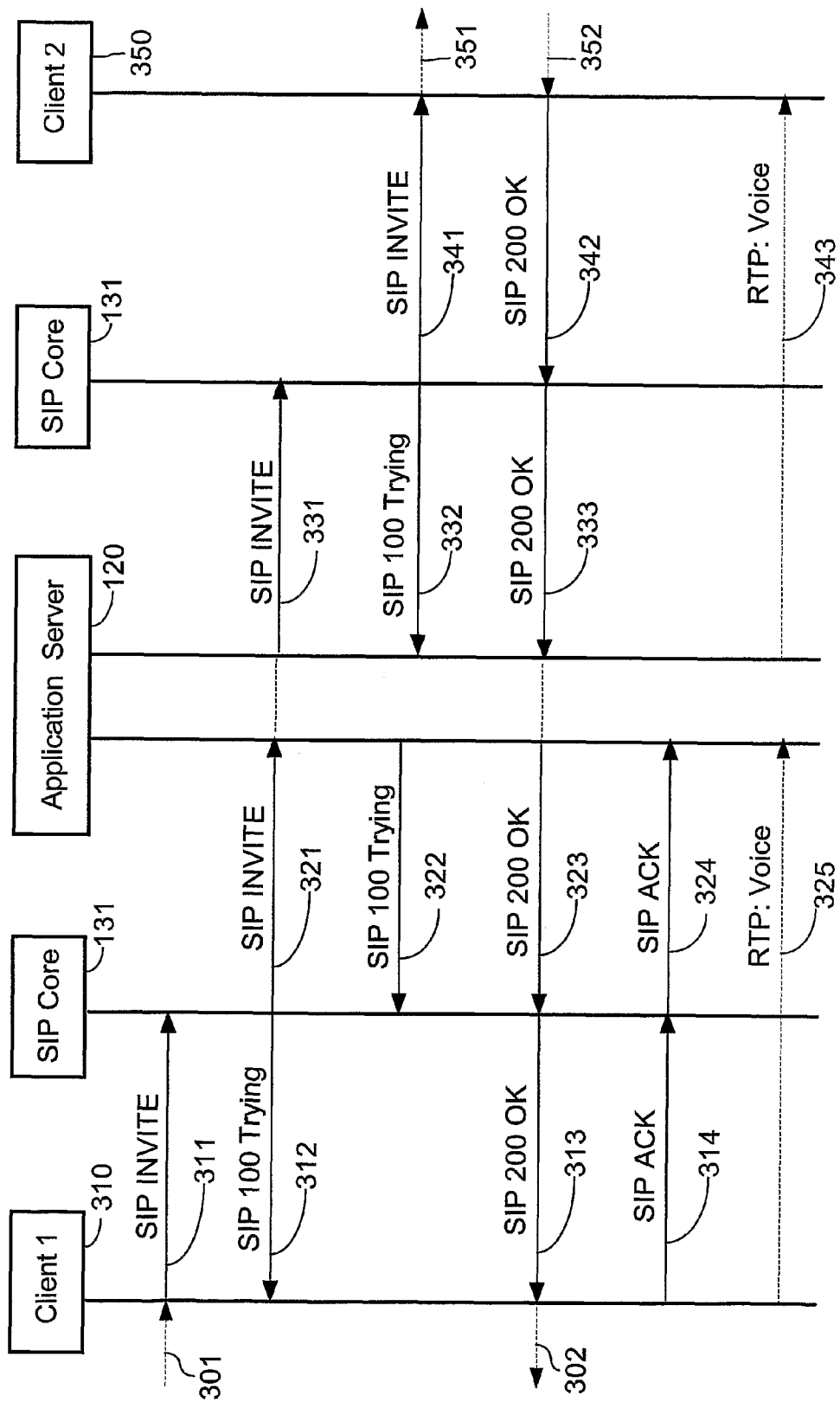
FIG. 3 is a flow chart describing the information flow for establishing a voice session in an embodiment involving VoIP and Video
Figure 4:
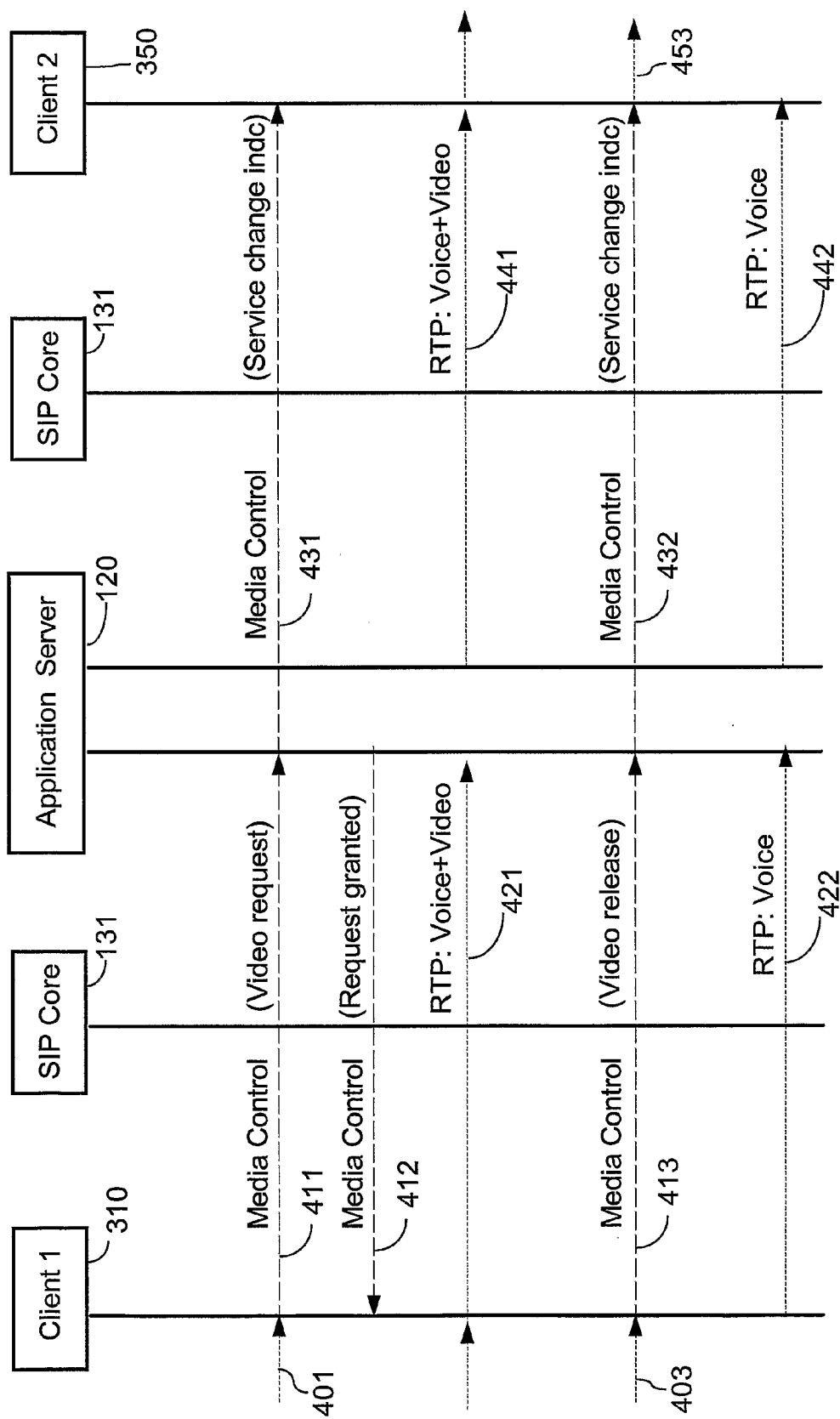
FIG. 4 is a flow chart and a continuation of FIG. 3 describing the information flow for requesting a service change in an established voice session in an embodiment involving VoIP and Video

FIGS. 3 and 4 describe an embodiment of a session establishment and a service change procedure for a VoIP (Voice over IP) conversation that is enriched with video (e.g. a video clip). Network entities involved in the information flow are two user terminals or multimedia clients, Client1 310 and Client2 350, the SIP Core 131 and the Application Server 120.

The multimedia clients 310, 350 are communicating with the Application Server 120 using SIP signaling and Media Control signaling. SIP signaling messages are typically transported on a session signaling channel 141 and are processed by a number of intermediate nodes in the signaling network, the SIP Core 131. The Media Control signaling is separated from the SIP Core and is transported on a media control channel 142. The Application Server 120 does also receive and re-transmit the media streams received from the multimedia clients 310, 350 on the media channel 143.

The information flow for establishing the session between Client1 310 and Client2 350 is illustrated in FIG. 3. FIG. 4 describes the information flow for the service change procedure.

A user using his/her Client1 310 requests to initiate 301 a multimedia session with another user using Client2 350. Client 1 310 sends a SIP INVITE message 311 to the SIP Core 131. The SIP INVITE message 311 includes a set of all media types Client1 310 can support (in this example voice and video). The SIP INVITE message 311 does also include a first set of requested media types (in this example voice only). The SIP Core 131 responds with a SIP 100 Trying message 312. The SIP 100 Trying message 312 indicates that the SIP INVITE message 311 has been received by the SIP Core 131 and that some unspecified action is being taken on behalf of this session. The SIP Core 131 sends a SIP INVITE message 321 to the Application Server 120 including the sets of media types received from Client1 310. The Application Server 120 responds with a SIP 100 Trying message 322 to the SIP Core 131. The Application Server 120 stores the sets of media types received from Client1 310 and sends a SIP INVITE message 331 to the SIP Core 131. The SIP Core 131 responds to the Application Server 120 with a SIP 100 Trying message 332 and sends a SIP INVITE message 341 to Client2 350. Client2 350 generates an incoming call indication 351 to the user of Client2. If the user accepts 352 the session invitation, Client2 350 sends a SIP 200 OK message 342 to the SIP Core 131 that in turn sends a SIP 200 OK message 333 to the Application Server 120. The two SIP 200 OK messages 342,333 carry a set of all media types Client2 350 can support (in this example voice and video) and this set is stored in the Application Server 120. The Application Server 120 compares the two sets of all media types that are supported by Client1 310 and Client2 350 respectively. As Client1 310 requested voice only to begin with and as Client2 350 supports voice, the Application Server 120 sends a SIP 200 OK message 323 including a first set of allowed media types (in this case voice only). The SIP Core 131 forwards this information to Client1 310 in a SIP 200 OK message 313. Client1 310 sends an SIP ACK message 314 to the SIP Core 131 that sends a SIP ACK message 324 to the Application Server 120.

It is now possible for Client1 310 to start sending voice towards Client2 350 via the Application Server 120 on the media channel 143 using the RTP protocol 325, 343.

If the user of Client1 during the voice conversation would like to, in addition to voice, send a live video clip to Client2 350, a service change is necessary. The information flow for this service change is found in FIG. 4. When the user of Client1 requests 401 to make this service change, Client1 310 sends a Media Control message 411 to the Application Server 120 with a request to transmit voice and video. As both Client1 310 and Client2 350 support video, the Application Server 120 grants this request with a Media Control message 412. The Application Server 120 does also send a Media Control message 431 to Client2 350 indicating a service change. Client1 310 can now send both a voice and a video media stream 421, 441 towards Client2 350.

When the user of Client1 requests to terminate 403 the video stream and continue with the voice stream only, Client1 310 sends a Media Control message 413 to the Application Server 120 requesting to release the video stream. The Application Server 120 does also send a Media Control message 432 to Client2 350 indicating a new service change.

Client1 310 does now send voice only 422, 442 towards Client2 350. As the Media Control message 413 concerned a release of one media type, it is not necessary for the Application Server 120 to send any response message.

Figure 5:
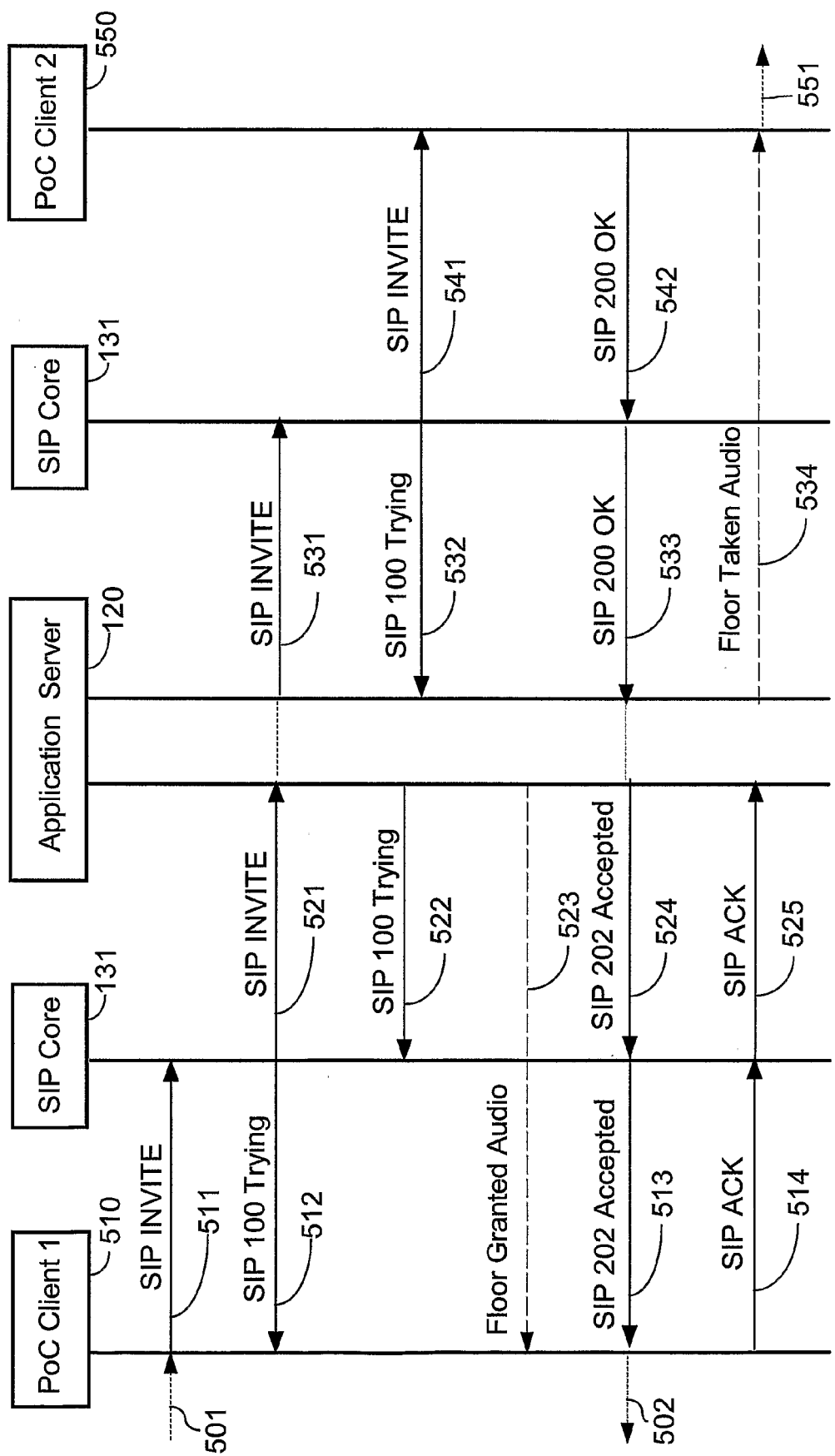
FIG. 5 is a flow chart describing the information flow for establishing a session in an embodiment involving PoC and Video
Figure 6:
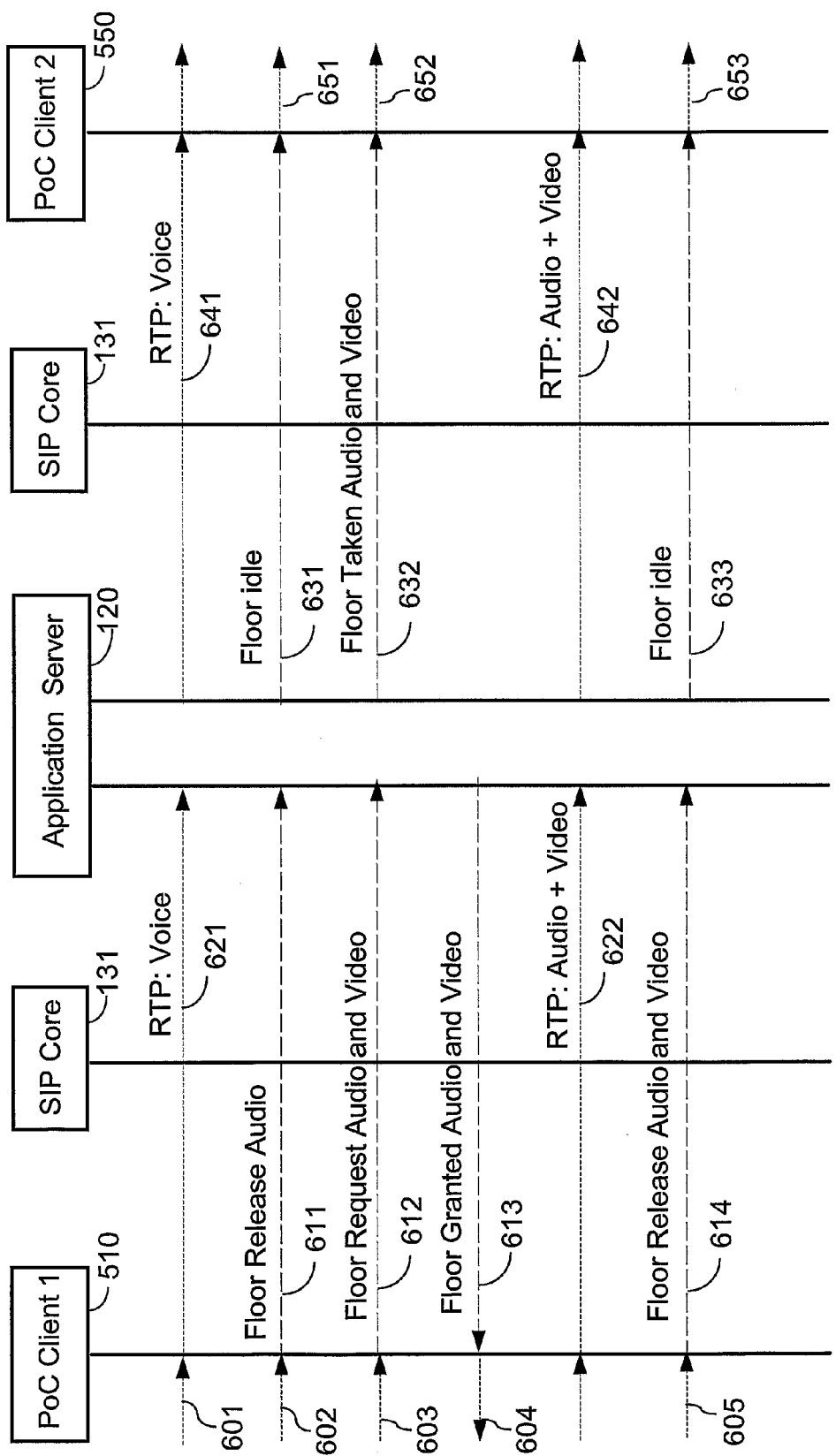
FIG. 6 is a flow chart and a continuation of FIG. 5 describing the information flow for requesting a service change in an established session in an embodiment involving PoC and Video

Another and a preferred embodiment of the invention is illustrated by FIG. 5 and FIG. 6. FIGS. 5 and 6 describe a session establishment and a service change procedure for PoC (Push-to-talk over Cellular) that is enriched with video. The principle is the same as for VoIP (FIGS. 3 and 4), but here the Media Control signaling is carried in the same messages as used in a Floor Control procedure known from PoC and conferencing applications. Floor control in a PoC context is basically the possibility for a user of a mobile telephone to request a half-duplex access to a communication channel common to a group of other mobile telephone users simply by pushing a button on the mobile telephone.

Starting with FIG. 5, a first PoC user press 501 a PoC button on his/her mobile telephone, a PoC Client1 510. If no session with other mobile telephones already exists, this event 501 starts a session initiation process by PoC Client1 510 that sends a SIP INVITE message 511 to the SIP Core 131. This SIP INVITE message 511 is also regarded as an implicit 'Floor Request'. The SIP INVITE message 511 includes a set of all media types PoC Client1 510 can support (in this example audio and video). The SIP INVITE message 511 does also include a first set of requested media types (in this example audio only). The SIP Core 131 responds to PoC Client1 510 with a SIP 100 Trying message 512 and sends a SIP INVITE message 521 to the Application Server 120. The SIP INVITE message 521 includes the sets of media types received from PoC Client1 510. The Application Server 120 responds with a SIP 100 Trying message 522 to the SIP Core 131. The Application Server 120 stores the set of all media types PoC Client1 510 can support and sends a SIP INVITE message 531 to the SIP Core 131. The SIP Core 131 responds to the Application Server 120 with a SIP 100 Trying message 532 and sends a SIP INVITE message 541 to a PoC Client2 550.

PoC Client2 550 sends a SIP 200 OK message 542 to the SIP Core 131 that in turn sends a SIP 200 OK message 533 to the Application Server 120. The two SIP 200 OK messages 542,533 carry a set of all media types PoC Client2 550 can support (in this example audio and video). This set of media types is stored in the Application Server 120. The Application Server 120 compares the two sets of all media types that are supported by PoC Client1 510 and PoC Client2 550 respectively. As PoC Client1 510 requested audio only to begin with and as PoC Client2 550 supports audio, the Application Server 120 sends a SIP 202 Accepted message 524. The SIP Core 131 forwards this information to PoC Client1 510 in a SIP 202 Accepted message 513. In conjunction with sending the SIP 202 Accepted message 524, the Application Server 120 does also send a message comprising a combination of a Media Request message and Floor Control message 523 with a first set of allowed media types (in this case audio).

PoC Client1 510 sends an SIP ACK message 514 to the SIP Core 131 that sends a SIP ACK message 525 to the Application Server 120. The user of PoC Client1 receives a talk indication 502 that it is possible to start talking. The Application Server 120 sends a Floor Taken Audio message 534 to PoC Client2 550 and the user of PoC Client2 receives a Listening Indication 551.

As illustrated by FIG. 6, it is now possible for PoC Client1 510 to start sending 601 a half-duplex audio stream towards PoC Client2 550 via the Application Server 120 on the media channel 143 using the RTP protocol 621, 641.

The user of PoC Client1 may at any time 'release the floor' and make the channel available to other PoC clients by releasing 602 the PoC button. A Floor Release Audio message 611 is sent to the Application Server 120. The Application Server 120 sends a Floor Idle message 631 to PoC Client2 550 to indicate that the floor is idle and the user of PoC Client2 receives a Floors Idle Indication 651 on PoC Client2 550.

At some time during the session, the user of PoC Client1 requests 603 to send a multimedia burst involving both audio and video. PoC Client1 510 sends a Floor Request Audio and Video message 612 to the Application Server 120. If the Application Server 120 grants the request, it sends a Floor Taken Audio and Video message 632 to PoC Client2 550 and a Floor Granted Audio and Video message 613 to PoC Client1 510. The user of PoC Client2 receives an Incoming Video and Audio Call indication 652 on PoC Client2 550 and the user of PoC Client1 receives 604 a Talk And Show indication on PoC Client1 550.

It is now possible for PoC Client1 510 to start sending a half-duplex voice and video stream towards PoC Client2 550 via the Application Server 120 on the media channel 143 using the RTP protocol 622, 642.

When the user of PoC Client1 requests to release 605 the audio and video stream, PoC Client1 510 will send Floor Release Audio and Video message 614 to the Application Server 120 and the Application Server 120 sends a Floor Idle message 633 to PoC Client2 550. The user of PoC Client2 receives a Floor Idle Indication 653 on PoC Client2 550 and the media channel between PoC Client1 510 and PoC Client2 550 is now idle. The 'floor' can now be requested by any of the clients involved in the session.

Although the embodiments of the invention as described and illustrated by the figures above are showing a service change between two multimedia clients only, the inventive concept is of course allowing a service change involving an arbitrary number of multimedia clients. For each new multimedia client that is invited, a SIP INVITE message is sent to the invited client via the Application Server 120. For each SIP 200 OK message that the Application Server 120 receives from each invited client, the sets of media types supported by each invited client and contained in these messages are stored in the Application Server 120. Each time an arbitrary multimedia client belonging to the session (a requesting multimedia client) sends a request to send a media stream (or sending a 'floor request'), the Application Server 120 grants this request based on the availability of the media channel 143 at that particular time and the media types supported by all the other involved multimedia clients. Again, the application server can very well grant the requesting multimedia client to transmit a certain media type even if certain multimedia clients belonging to the session do not support this. The application server will in this case terminate the media flow with this media type inside the application server instead of re-transmit it to these certain multimedia clients.

It is also important to emphasize that the term 'media type' should be interpreted as being not just voice, video, images etc as such, but could for example also mean different types of codecs using different algorithms for encoding/decoding voice, video etc.

The invention claimed is:

1. A method in an application server for providing different services and performing service changes in a multimedia communication system that includes the application server and a plurality of multimedia clients, the method comprising the steps of:
   receiving, by the application server on a session signaling channel, a request from a first multimedia client inviting at least a second multimedia client to be part of a multimedia session;
   receiving by the application server on the session signaling channel, a first set of supported media types from the first multimedia client, the first set of supported media types indicating a set of media types supported by said first multimedia client;
   sending on the session signaling channel from the application server to the second multimedia client, a request inviting said second multimedia client to be part of the multimedia session;
   receiving by the application server on the session signaling channel, a second set of supported media types from the second multimedia client, the second set of supported media types indicating a set of media types supported by said second multimedia client;
   storing by the application server, the sets of media types supported by the first and the second multimedia clients;
   receiving by the application server on a media control channel that is distinct from the session signaling channel, a transmission request from a transmitting multimedia client in the multimedia session requesting to transmit a first media stream towards a receiving multimedia client in the multimedia session, the transmission request comprising a first set of requested media types, wherein the transmitting multimedia client is one of the first or the second multimedia clients and the receiving multimedia client is another one of the first or the second multimedia clients;
   comparing by the application server, the first set of requested media types with the stored supported media types for the receiving multimedia client to verify that the first set of requested media types is supported by the receiving multimedia client;
   sending on the media control channel from the application server to the transmitting multimedia client, a first grant allowing one or more of the first set of requested media types, indicated as a first set of allowed media types;
   receiving by the application server, the first media stream from the transmitting multimedia client, the first media stream including one or more media types of the first set of allowed media types;
   re-transmitting by the application server, the first media stream to the receiving multimedia client;
   during the multimedia session, receiving by the application server on the media control channel, a service change request from the transmitting multimedia client requesting to transmit a second media stream to the receiving multimedia client without re-establishing the multimedia session, the service change request comprising a second set of requested media types;
   comparing by the application server, the second set of requested media types with the stored supported media types for the receiving multimedia client to verify that the second set of requested media types is supported by the receiving multimedia client;
   sending on the media control channel from the application server to the transmitting multimedia client, a second grant allowing one or more of the second set of requested media types, indicated as a second set of allowed media types;
   receiving by the application server from the transmitting media client, the second media stream in addition to the first media stream, the second media stream including one or more media types of the second set of allowed media types; and
   re-transmitting the second media stream from the application server to the receiving multimedia client in addition to the first media stream.

2. The method according to claim 1, wherein the request inviting at least a second multimedia client and said first set of media types supported by the first multimedia client are transported in session invitation messages.

3. The method according to claim 2, wherein the second set of supported media types supported by the second multimedia client is transported in a session response message.

4. The method according to claim 3, wherein the request to transmit a first media stream in accordance with the first set of requested media types is transported in a session invitation message.

5. The method according to claim 4, wherein the first grant is transported in a session response message.

6. The method according to claim 5, wherein the session invitation and session response messages utilize Session Initiation Protocol (SIP) signaling.

7. The method according to claim 1, wherein the request to transmit a first media stream in accordance with the first set of requested media types is transported in a media control message.

8. The method according to claim 1, wherein the first grant is transported in a media control message.

9. The method according to claim 1, wherein the request to transmit a second media stream in accordance with the second set of requested media types and said second grant are transported in media control messages.

10. The method according to claim 1, wherein the first and second media streams are transported on a media channel.

11. The method according to claim 1, wherein a specific media type in the first or second media streams received from the transmitting multimedia client intended for a particular receiving multimedia client is terminated if the specific media type is not among the media types supported by the particular receiving multimedia client.

12. The method according to claim 1, wherein each of the first and the second set of requested media types is equal to or is a subset of a set of media types supported by the transmitting multimedia client.

13. An application server for providing different services and performing service changes in a multimedia communication system that includes the application server and a plurality of multimedia clients, the application server comprising:

at least one signaling interface configured to receive and transmit session signaling on a signaling channel from and to the multimedia clients, the session signaling including:
  a request received from a first multimedia client to invite at least a second multimedia client to be part of a multimedia session;
  a first set of supported media types received from the first multimedia client, the first set of supported media types indicating a set of media types supported by the first multimedia client;
  a request sent from the application server to the second multimedia client inviting the second multimedia client to be part of the multimedia session; and
  a second set of supported media types received from the second multimedia client, the second set of supported media types indicating a set of media types supported by the second multimedia client;
a memory area configured to store the sets of media types supported by the plurality of multimedia clients;
at least one media control interface configured to receive and transmit media control signaling on a media control channel from and to the multimedia clients, the media control signaling including:
  a transmission request received from a transmitting multimedia client in the multimedia session requesting to transmit a first media stream towards a receiving multimedia client in the multimedia session, the transmission request comprising a first set of requested media types, wherein the transmitting multimedia client is one of the first or the second multimedia clients and the receiving multimedia client is another one of the first or the second multimedia clients;
  a first grant allowing one or more of the first set of requested media types sent from the application server to the transmitting multimedia client, the first grant indicating a first set of allowed media types;
  a service change request from the transmitting multimedia client requesting to transmit a different, second media stream in replacement of the first media stream to the receiving multimedia during the multimedia session and without re-establishing the multimedia session, the service change request comprising a second set of requested media types; and
  a second grant allowing one or more of the second set of requested media types sent from the application server to the transmitting multimedia client, the second grant indicating a second set of allowed media types;
wherein the application server compares each set of requested media types received from the transmitting multimedia client with the stored supported media types for the receiving multimedia client to verify that the first and second sets of requested media types are supported by the receiving multimedia client;
at least one media interface configured to receive and transmit media streams on a media channel from and to the multimedia clients, the media streams including:
  the first media stream received from the transmitting multimedia client, the first media stream including one or more media types of the first set of allowed media types;
  a re-transmitted first media stream sent from the application server to the receiving multimedia client;
  the second media stream received from the transmitting multimedia client, the second media stream including one or more media types of the second set of allowed media types; and
  a re-transmitted second media stream sent in replacement of the first media stream from the application server to the receiving multimedia client; and
a processor and logic configured to process the session signaling and the media control signaling and for performing service changes.

14. The application server according to claim 13, wherein the application server is further configured to terminate at least one of the media types in a media stream received from one of the multimedia clients if certain ones of the multimedia clients do not support these media types.

15. The application server according to claim 13, wherein the media control interface is integrated in the media interface.

16. The application server according to claim 13, wherein the signaling interface supports Session Initiation Protocol (SIP) signaling.

17. The application server according to claim 13, further comprising:
  a replication unit for replicating a received media stream from one of the multimedia clients into a plurality of media streams intended for a plurality of the multimedia clients.

18. A method in an application server for providing different services and performing service changes in a multimedia communication system that includes the application server and a plurality of multimedia clients engaged in a multimedia session, the method comprising the steps of:
  receiving by the application server on a session signaling channel, sets of supported media types indicating media types supported by each of the plurality of multimedia clients;
  storing by the application server, the sets of media types supported by the plurality of multimedia clients;
  receiving by the application server on a media control channel that is distinct from the session signaling channel, a transmission request from a transmitting multimedia client in the multimedia session requesting to transmit a first media stream towards a receiving multimedia client in the multimedia session, the transmission request comprising a first set of requested media types;
  comparing by the application server, the first set of requested media types with the stored supported media types for the receiving multimedia client to verify that the first set of requested media types is supported by the receiving multimedia client;
  sending on the media control channel from the application server to the transmitting multimedia client, a first grant allowing one or more of the first set of requested media types, indicated as a first set of allowed media types;
  receiving by the application server, the first media stream from the transmitting multimedia client, the first media stream including one or more media types of the first set of allowed media types;

re-transmitting by the application server, the first media stream to the receiving multimedia client;

during the multimedia session, receiving by the application server on the media control channel, a service change request from the transmitting multimedia client requesting to transmit a second media stream to the receiving multimedia client without re-establishing the multimedia session, the service change request comprising a second set of requested media types;

comparing by the application server, the second set of requested media types with the stored supported media types for the receiving multimedia client to verify that the second set of requested media types is supported by the receiving multimedia client;

sending on the media control channel from the application server to the transmitting multimedia client, a second grant allowing one or more of the second set of requested media types, indicated as a second set of allowed media types;

receiving by the application server from the transmitting media client, the second media stream including one or more media types of the second set of allowed media types; and re-transmitting the second media stream from the application server to the receiving multimedia client, wherein the second media stream is selectively transmitted in addition to the first media stream, in replacement of the first media stream, or as a change to the first media stream based on subscriber information for the transmitting and receiving multimedia clients and local policies enforced by the application server.

* * * * *